United States Patent [19]

Welck

[11] Patent Number: 4,802,750

[45] Date of Patent: Feb. 7, 1989

[54] REAL IMAGE PROJECTION SYSTEM WITH TWO CURVED REFLECTORS OF PARABOLOID OF REVOLUTION SHAPE HAVING EACH VERTEX COINCIDENT WITH THE FOCAL POINT OF THE OTHER

[75] Inventor: Steve A. Welck, Santa Monica, Calif.

[73] Assignee: Grand Mirage, Van Nuys, Calif.

[21] Appl. No.: 80,761

[22] Filed: Aug. 3, 1987

[51] Int. Cl.$^4$ .................... G02B 17/06; G02B 5/10; G02B 7/18
[52] U.S. Cl. .................................................. 350/619
[58] Field of Search ............... 350/619, 616, 617, 618, 350/625, 630; 272/8 M, 8 D, 13, 14; 434/386

[56] References Cited

U.S. PATENT DOCUMENTS 4,443,058  4/1984  Bosserman .................... 350/619

FOREIGN PATENT DOCUMENTS 1154711  9/1963  Fed. Rep. of Germany ...... 350/619

Primary Examiner—Jon W. Henry
Attorney, Agent, or Firm—Kolisch, Hartwell & Dickinson

[57] ABSTRACT

A real image projection system including a pair of facing, off-optical-axis curvilinear reflectors which, with a real object placed at one location along a common optical axis in the system, produce a projected image of the object at another location along the axis. In one form of the system, both curvilinear reflectors are real structures. In another form of the invention, one of the reflectors is real, and other virtual.

4 Claims, 2 Drawing Sheets

REAL IMAGE PROJECTION SYSTEM WITH TWO CURVED REFLECTORS OF PARABOLOID OF REVOLUTION SHAPE HAVING EACH VERTEX COINCIDENT WITH THE FOCAL POINT OF THE OTHER

BACKGROUND AND SUMMARY OF THE INVENTION

This invention pertains to a real image projection system, and in particular, to a system which is capable of creating the illusion that a real object exists at a certain point in space when, in fact, no such object is actually there.

Those who are familiar with the art of creating various optical illusions are aware that a number of devices have existed in the past for creating the appearance that a real object resides at a particular location when, in fact, it really isn't there. For example, U.S. Pat. No. 3,647,284, issued on Mar. 7, 1972 to Elings et al for "Optical Display Device", shows and describes a structure wherein a pair of facing concave mirrors, one of which is continous across its optical axis, and the other of which is apertured near the axis, is capable of creating the illusion that a real object, which actually is lying on the surface of the continuous mirror surface, is floating in space above the aperture in the other surface. Thus, this device creates, from a real object which is at a distant location, a real image thereof which makes the object appear to be located at a point in space where actually no such thing exists.

The present invention, which certainly has, and recognizes, a generic relationship with the structure shown in the '284 patent, proposes a significantly improved optical system which offers a great deal more versatility.

While it will be apparent to those skilled in the art that the system which is disclosed and claimed herein can have a wide variety of applications, a preferred embodiment of the invention is described in the setting of a product display device wherein it has been found to offer significant utility.

According to a preferred embodiment of the invention, two, off-axis, concave, confronting expanses, each having a focal point, are positioned relative to one another in such a manner that a real object placed at one location near one of the focal points along the optical axis which is common to the two, results in the production and projection of a real image of that object near the other focal point and generally along the axis. Precise positioning of an object along the axis is not a requirement for successful use of the system. Rather, there is, as will be more fully expressed below, what might be thought of as a real object "zone" which includes regions that are off axis. An image projected from an object placed in this real object zone will reside in a real image "zone" which also occupies space around the axis.

In the preferred embodiment of the invention, the two confronting reflective expanses are real structures. In a modification of the invention illustrated and described herein, one of these expanses is real, and other other, which takes the form of a reflection of the first surface in a plain mirror, is a virtual expanse. This modification, with certain exceptions, operates much in the same way as the unmodified preferred embdiment.

The system of the invention, which can be made in a variety of different sizes and scales to suit different applications, is capable of producing a strikingly catchy, real image of an object which is actually located at a quite remote location.

Various other advantages and features of the invention will become more fully apparent as the detailed description which now follows is read in conjunction with the accompanying drawings.

DETAILED DESCRIPTION OF THE INVENTION

Figure 1:
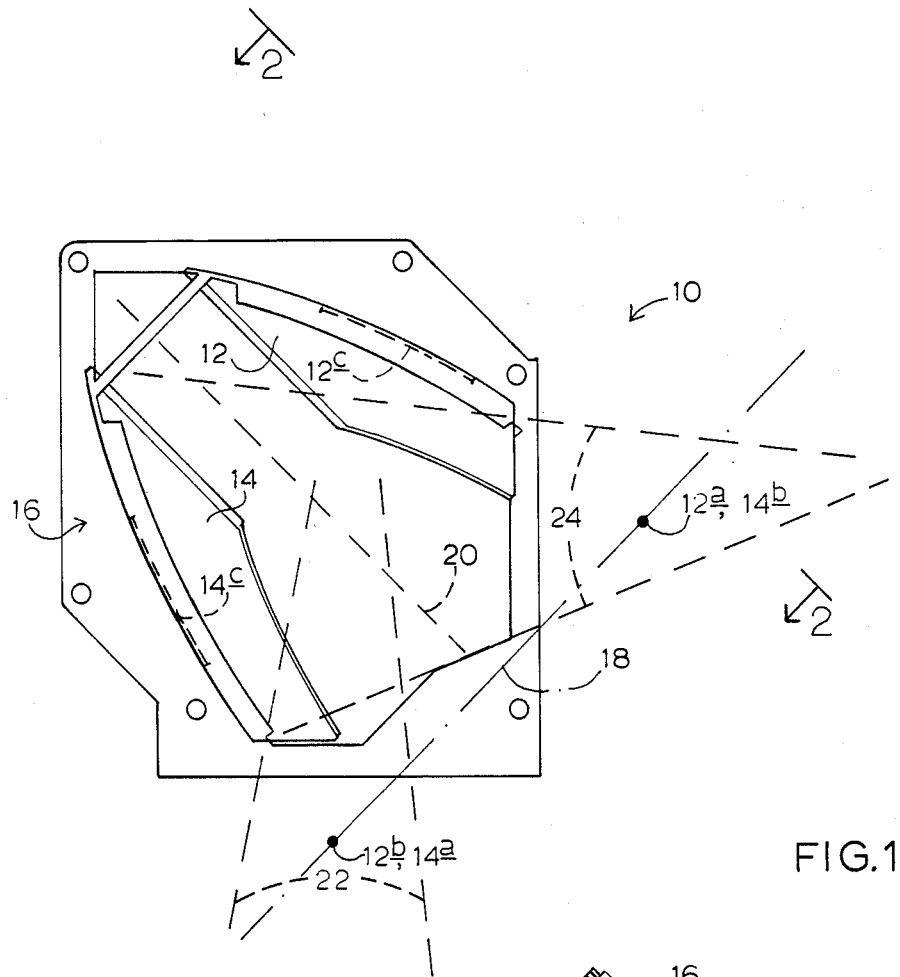
FIG. 1 is a side view of preferred embodiment of the present invention showing a pair of confronting, curvilinear, off-axis, reflective mirrors (expanses) mounted in a supporting frame.
Figure 2:
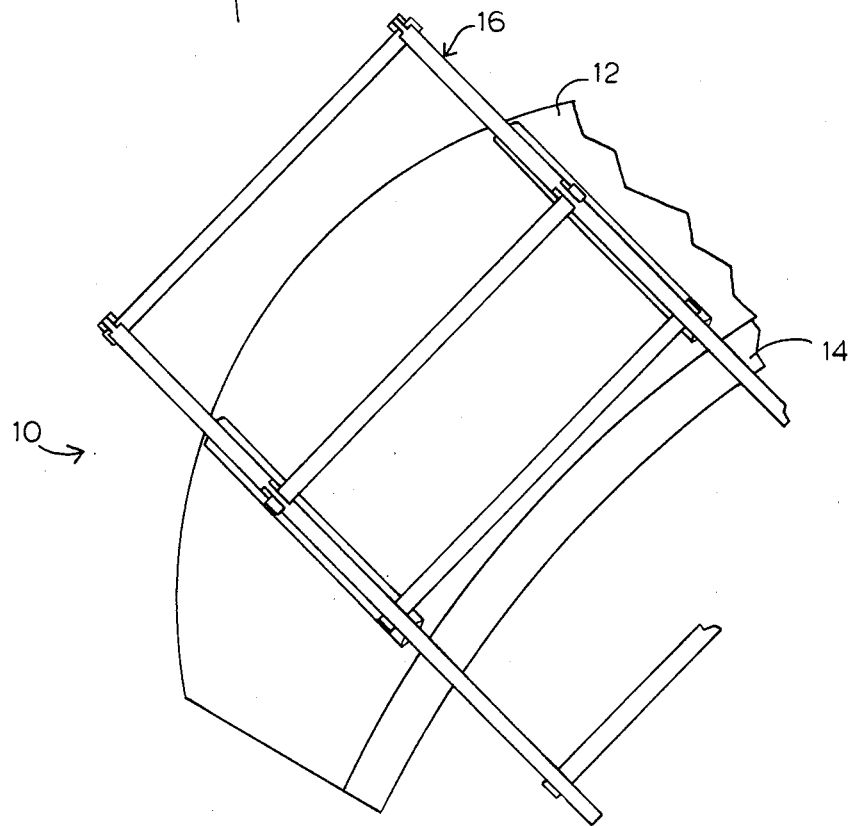
FIG. 2 is a view taken generally along line 2—2 in FIG. 1, substantially on the common optical axis of the mirrors.
Figure 3:
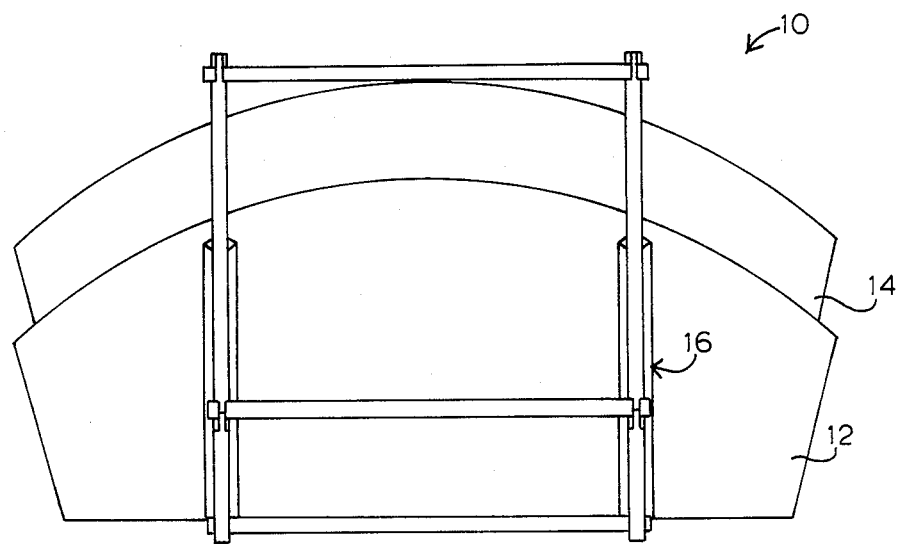
FIG. 3 is a view taken from the top of FIG. 1.

Turning now to the drawings, and addressing attention initially to FIGS. 1-3, inclusive, indicated generally at 10 is a real image projection system which is constructed in accordance with a preferred embodiment of the present invention.

System 10 which, as can be seen, is remarkably simple in construction, includes a pair of what are referred to herein as off-axis, confronting curvilinear mirrors, or reflective expanses, 12, 14 which are suitably supported on an appropriate supporting frame, indicated generally at 16. It will become apparent to those skilled in the art that the supporting frame can take a variety of specific forms depending upon the decided application for the system, and, accordingly, a detailed description of frame 16, which is not important to an understanding of the invention, is not provided herein. Preferably, however, frame 16 is as lightweight and skeletal as possible.

Each of mirrors 12, 14 herein is formed as a segment of a parabolic dish having a nominal diameter of about 60-inches, with mirror 12, as can be seen particularly in FIG. 2, being slightly smaller than mirror 14. Each mirror has a focal length of about 25 inches. Mirror 12, the upper mirror in the figures, has what might be thought of as a nominal vertex 12a which is located where the centroid of the mirror would be were it a complete parabolic dish. This mirror also includes a focal point 12b. Vertex 12a and focal point 12b are located on the optical axis 18 of mirror 12.

Mirror 14 includes a vertex 14a and a focal point 14b. The two mirrors are positioned by frame 16 in such a manner that vertex 12a coincides with focal point 14b, and that focal point 12b coincides with vertex 14a, with both mirrors sharing axis 18 as a common optical axis. As can be seen clearly in FIG. 1, mirrors 12, 14 diverge progressing radially toward axis 18, with the mirrors located to one side only of, and spaced from, axis 18. This arrangement is an important feature which leads to special advantages offered by system 10.

While the mirrors may be formed of any suitable material, a material which has been found to work well is thermoformed acrylic. In the particular system being illustrated, the overall width of the system, as the same is viewed in FIG. 3 is about 50 inches.

Referring particularly to FIG. 1, illustrated by a dashed line 20 is a plane which may be thought of as symmetrically dividing the mirrors, which plane intersects axis 18 at a right angle. In the particular system being shown herein, this plane is oriented at an angle of about 45° to the horizontal, with the result that the front, or viewing, side of the system is toward the right side of FIG. 1. Outwardly and downwardly diverging dashed lines 22 define, substantially in the area around focal point 12b, what is referred to herein as a real object zone. Outwardly and rightwardly converging lines 24 in FIG. 1 define, substantially around focal point 14b, what is referred to herein as a real image zone. Any object which is placed in the real object zone, and preferably, from the standpoint of having minimal distortion, relatively closely adjacent focal point 12b, will result in the production by the system of a real, three-dimensional image of that object in zone 24 near focal point 14b. The field of view which an observer of this image is provided is dependent upon the specific sizes of mirrors 12, 14 (front to rear and side to side). These sizes are strictly a matter of designer choice.

Still referring to FIG. 1, a small portion of mirror 12 is designated by dashed lines 12c, and a similar small portion of mirror 14 is designated by dashed line 14c. This has been done in order to provide a basis for an explanation of a somewhat modified form of system 10, wherein these small portions can be imagined to form parts of extremely large parabolic surfaces, with each, for example, having lateral dimensions on a side of about 10 or 15 feet. With this kind of construction, and with these two enlarged, confronting parabolic reflectors supported and spaced appropriately relative to one another in the same general relationship shown in FIG. 1, the system offers the opportunity to create startling real images of very large objects contained in the appropriate, related real object zone.

From the above, it should be apparent to those skilled in the art that the basic structure of system 10 shown in FIGS. 1–3, inclusive, opens the door to a wide variety of functional variations which can be used to create illusory real images in a large number of varied applications.

Figure 4:
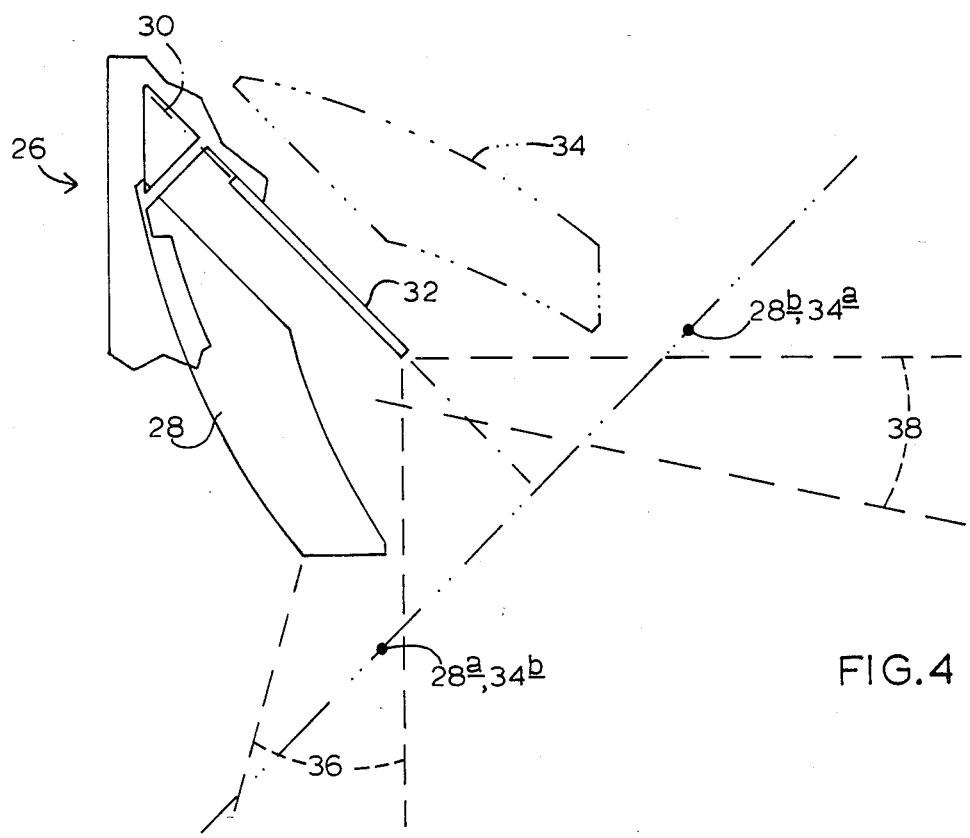
FIG. 4 which is somewhat like FIG. 1, shows a modified form of the invention, wherein one of the curvilinear, reflective expanses therein is a real expanse, and the other is a virtual expanse.

Turning attention now to FIG. 4, here there is shown at 26 a modified form of the system constructed in accordance with the invention. System 26 includes a mirror, or reflective expanse, 28 which is like previously mentioned mirror 14, having a vertex 28a and a focal point 28b. Facing mirror 28, along a plane 30 which corresponds to previously mentioned plane 20, is a plane mirror 32.

With mirrors 28, 32 facing one another as shown, a virtual image 34 of mirror 28 is created in mirror 32, and this virtual image cooperates with mirror 28 to produce a real image projection capability which is substantially the same as that described in conjunction with system 10. Thus, the virtual vertex of image 34, 34a, coincides with focal point 28b, and the virtual focal point of image 34, 34b, coincides with vertex 28a. System 26 includes a real object zone defined between dashed lines 36, and a real image zone defined generally by dashed lines 38 in FIG. 4.

While it will be apparent to those reading this description, now, that the system proposed by the present invention can be used in a wide variety of applications, one wherein it has found initial, and strong, utility is in the field of display advertising. With the system suitably housed in a container which effectively conceals the presence of the mirrors, and which also hides the real object zone, any object which is to be placed on display may be located in the object zone, properly illuminated, and projected as a floating image out to the front of the system in the real image zone. This object need not be stationary, and, for example, may be mounted on a turntable which gives the object rotational motion in space in front of the system. Other display techniques can of course, be used.

As was mentioned earlier, an important feature of the invention is that both of the reflective expanses in the system of the invention are spaced from and located to one side only of the optical axis of the system. With this construction, the system allows a real object of substantial dimension to be placed in the real object zone with substantial depth of field, and projected as an effective three-dimensional image in the real image zone.

While a preferred embodiment, and certain modifications of the invention have been described herein, it is appreciated that other variations and modifications are possible without departing from the spirit of the invention.

It is claimed and desired to secure by letters patent:

1. A real image projection system comprising
an optical axis extending through a real object zone and a real image zone, and
a pair of paraboloid-of-revolution-segment, compound curvilinear reflective expanses spaced from, and located on one side only of, said axis adjacent said zones, operable, with a real object occupying said real object zone, to create a real image thereof in said real image zone,
said expanses each having a vertex and a focal point defined by the parabloid-of-revolution associated with each of said expanses, with the vertex of each being substantially coincident with the focal point of the other.

2. A real image projection system comprising
means defining first and second confronting, real-image-capable, paraboloid-of-revolution-segment, compoundly curved reflective expanses which share, and are spaced from, a common optical axis, and
means positioning said expanses relative to one another in such a manner that they diverge progressing therealong generally radially toward said axis, whereby an object placed at one defined location along said axis results in the existence, at another defined location along the axis, of a projected real image of the object,
said expanses each having a vertex and a focal point defined by the paraboloid-of-revolution associated with each of said expanses, with the vertex of each being substantially coincident with the focal point of the other.

3. A real image projection system comprising
first and second, real-image-capable, paraboloid-of-revolution-segment, compoundly curved reflective expanses, each having a remote optical axis, and
means positioning said expanses relative to one another in such a manner that they face each other with their optical axis coincident, and with the expanses diverging progressing therealong generally toward said axis,
said expanses, so positioned, defining, on one said of a plane dividing the expanses, which plane is substantially normal to said axis, a real object zone, and on the other side of said plane, a real image zone wherein a real image appears of any object placed in said real object zone;

said expanses each having a vertex and a focal point defined by the paraboloid-of-revolution associated with each of said expanses, with the vertex of each being substantially coincident with the focal point of the other.

4. A real image projection system comprising
- a first paraboloid-of-revolution-segment, compoundly curved, concave reflector having a focal point and formed as an off-axis segment of a surface of revolution of a first curved line about an axis, which first line defines a first vertex, and
- a second paraboloid-of-revolution-segment, compoundly curved, concave reflector having a focal point and formed as an off-axis segment of a surface of revolution of a second curved line about the same axis, which second line defines a second vertex,
- said first and second reflectors facing one another in a manner whereby the focal point of the first reflector is coincident with said second vertex along said axis, and the same is true vis-a-vis the focal point of the second reflector and said first vertex.

* * * * *